United States Patent [19]

Harper et al.

[11] Patent Number: 5,725,332
[45] Date of Patent: Mar. 10, 1998

[54] AIR LOCK FEEDER APPARATUS

[75] Inventors: Derick E. Harper, Wilton; Gordon D. Hammond, Elk Grove, both of Calif.

[73] Assignee: Saf-T-Source, Inc., Elk Grove, Calif.

[21] Appl. No.: 639,686

[22] Filed: Apr. 29, 1996

Related U.S. Application Data

[60] Provisional application No. 60/003,790, Sep. 14, 1995.
[51] Int. Cl.$^6$ .................................................. B65G 53/08
[52] U.S. Cl. .................................................. 406/67
[58] Field of Search ........................... 239/654; 406/39, 406/63, 65, 67, 68

[56] References Cited

U.S. PATENT DOCUMENTS

| | | | |
|---|---|---|---|
| 2,338,096 | 1/1944 | Chater. | |
| 2,669,271 | 2/1954 | Treckmann. | |
| 2,712,475 | 7/1955 | Lukes | 406/67 |
| 2,740,230 | 4/1956 | Clapper. | |
| 2,844,914 | 7/1958 | Finn. | |
| 3,015,188 | 1/1962 | Reinecker et al.. | |
| 3,268,266 | 8/1966 | Brown | 406/67 X |
| 3,399,931 | 9/1968 | Vogt | 406/67 X |
| 4,475,819 | 10/1984 | Balmer. | |
| 4,710,067 | 12/1987 | Salley | 406/67 X |
| 4,852,809 | 8/1989 | Davis et al.. | |
| 5,178,333 | 1/1993 | Barber et al.. | |

FOREIGN PATENT DOCUMENTS 1347886 2/1974 United Kingdom ..................... 406/67

OTHER PUBLICATIONS

AMZ Magnum Brochure, Zimmerman Equipment Company, Nashville, TN, Nov. 1993.

Rexius Express Blower Brochure, Rexius Forest By-Products, Inc. Eugene, OR—Oct. 1993.

*Primary Examiner*—Kevin Weldon
*Attorney, Agent, or Firm*—John P. O'Banion

[57] ABSTRACT

An air lock feeder for entrainment of solid particulate materials in an air stream. The invention includes a cylindrical housing with a shaft rotatably mounted in the ends of the housing. Inlet and outlet ports are included in the housing ends, and a lateral opening in the housing receives solid particulate material. A plurality of vanes extend laterally from the shaft and define a plurality of chambers within the housing, with the cambers generally parallel to the shaft and extending between the housing ends. Preferably, a flexible strip is included on the end of each vane adjacent the housing. Dividers located between adjacent vanes separate air channels from the chambers. The chambers are charged with solid material from the lateral facing opening in the housing as shaft rotates within the housing. Pressurized air enters the chambers via inlet port as each chamber rotatably moves past the inlet port, and the material within the chambers is entrained in an air stream and carried out the exit port. The air channels provide a super charging effect and introduce pressurized air to the entrained material from the chambers adjacent to the exit port.

10 Claims, 3 Drawing Sheets

AIR LOCK FEEDER APPARATUS

CROSS-REFERENCE TO RELATED APPLICATIONS

This application claims the benefit of U.S. Provisional Application Ser. No. 60/003,790 filed on Sep. 14, 1995.

BACKGROUND OF THE INVENTION

1. Field of the Invention

The present invention pertains generally to devices and methods for entraining solid material in an air or gas stream, and more particularly to an air lock feeder with supercharger air chambers which provide for increased output of air-entrained particulate solids.

2. Description of the Related Art

In the past, the devices and methods used to install aggregate materials for playgrounds and landscaping have ranged from using manual labor and hand operated conveying devices (wheel barrows), to the use of construction equipment such as tractors, front end loaders, or a combination of both. Various apparatus and systems, including blower devices, are known for blowing, dispersing or applying materials to land, building, and other surfaces. These devices and systems, however, have generally been developed for agricultural use with seeds and fertilizers, for applying surfacing materials to roads, or for dispensing blown insulation material during building construction, and are not suitable for application of aggregate materials for landscaping, playgrounds, and other surfaces.

Pneumatically conveyed materials are generally applied in one of three ways: light phase, using a high volume/low pressure suction fan at operating pressures of 1 to 3 PSI; medium phase, wherein a medium volume/medium pressure blower or fan is used at operating pressures of 2 to 30 PSI; and dense phase, which uses a low volume/high pressure air compressor at operating pressures of 80 to 120 PSI. The terms light, medium and dense phase are used in the art to generally describe the ratio of solid material to air within an applicator hose conveying the material.

Generally, for aggregate materials it is desirable to move as much material as fast as possible, and a dense phase material application system would appear to be the obvious choice. However, dense phase systems require at least two pressure silos which cannot readily be loaded or transported by a materials carrier. Additionally, a dense phase system for application of aggregate materials would require a power plant so large to produce the necessary high air pressure that it would not be cost effective or practical.

Currently existing light phase blowing equipment such as insulation blowers typically utilize a low air pressure/high air volume fan to vacuum up and pneumatically convey insulation product or material. However, the open chamber vacuum design used by insulation blowers to draw product into the airstream of an applicator hose severely limits the cubic yardage output of such blowers, with a maximum output of approximately 5 cubic yards per hour. This output rate falls considerably short of the 30 cubic yards per hour necessary to make such blowers commercially viable for use with aggregate materials.

Thus, a medium phase system as described above would be best suited for use in pneumatic conveyance of aggregate materials. Medium phase systems generally utilize an airlock feeder to meter product into the airstream and a positive displacement medium air pressure, medium air volume blower to convey the product through an applicator hose. Such a system has the capability to use a smaller volume of air to move a larger volume of product. However, a medium phase rate for pneumatic conveyance and application of aggregate materials such as engineered wood fiber has not heretofore been achieved.

Accordingly, there is a need for a air lock feeder apparatus which pneumatically conveys and applies aggregate materials, which conveys such materials at medium phase rates, and which may be used in landscaping, playground, and other ground covering applications.

SUMMARY OF THE INVENTION

The primary object of the invention is to provide an air lock feeder apparatus for use with blower systems such as those used to transfer "Engineered Wood Fibre", wood chips, or other aggregate landscaping material from a "live floor" truck directly to a playground or other landscaped area. The use of a blower and hoses or pipes to transfer material, as provided by the invention, eliminates the need for a tractor or front loader, and provides a clean and efficient manner of applying material to ground surfaces. Material can be installed in a shorter amount of time with less manpower. The air lock feeder apparatus comprising the invention is disclosed in terms of use with a chip blowing apparatus. It will be readily apparent to those of ordinary skill in the art, however, that the air lock feeder apparatus may be used with a variety of devices and systems for entraining various types of particulate solids within air or gas streams.

In general terms, the present invention is coupled to a hopper or other container for holding wood chips or the like, wherein there is an agitating means for directing material downward in the hopper. The material passes from the hopper to the air lock feeder of the invention, where it is discharged using pressurized air or the like. Air supercharger means included with the air lock feeder allow faster output rates of air-entrained particulate solids such as aggregate materials including wood chips and engineered wood fiber, seeds, fertilizer, road surfacing materials, insulation, or other solid particulate material which can be pneumatically conveyed and applied.

By way of example and not of limitation, the air lock feeder preferably comprises a generally cylindrical steel housing with a rotating shaft longitudinally mounted therein. A plurality of vanes or blades are included along the shaft which define a plurality of longitudinal chambers within the housing which move with the rotation of the shaft. An air inlet port and air outlet port are included at opposite ends of the cylindrical housing, which ports are in air flow communication with the moving chambers. Preferably, air supercharging means are included with the air lock feeder in association with the chambers for increasing the output of the air lock feeder.

An object of the invention is to provide a air lock feeder apparatus for application of wood chips or other aggregate materials to land surfaces without the use of heavy equipment.

Another object of the invention is to provide a air lock feeder apparatus which is time and labor efficient.

Another object of the invention is to provide a air lock feeder apparatus which allows application of aggregate materials without damage to surrounding landscaped areas.

Another object of the invention is to provide a air lock feeder apparatus which allows even application of aggregate materials to shallow depths without creating bare spots or spots with excessive material.

Another object of the invention is to provide a air lock feeder apparatus which allows medium phase pneumatic conveyance of aggregate materials.

Further objects of the invention will be brought out in the following portions of the specification, wherein the detailed description is for the purpose of fully disclosing the invention without placing limits thereon.

BRIEF DESCRIPTION OF THE DRAWINGS

The invention will be more fully understood by reference to the following drawings which are for illustrative purposes only.

DETAILED DESCRIPTION OF THE PREFERRED EMBODIMENT

Figure 1:
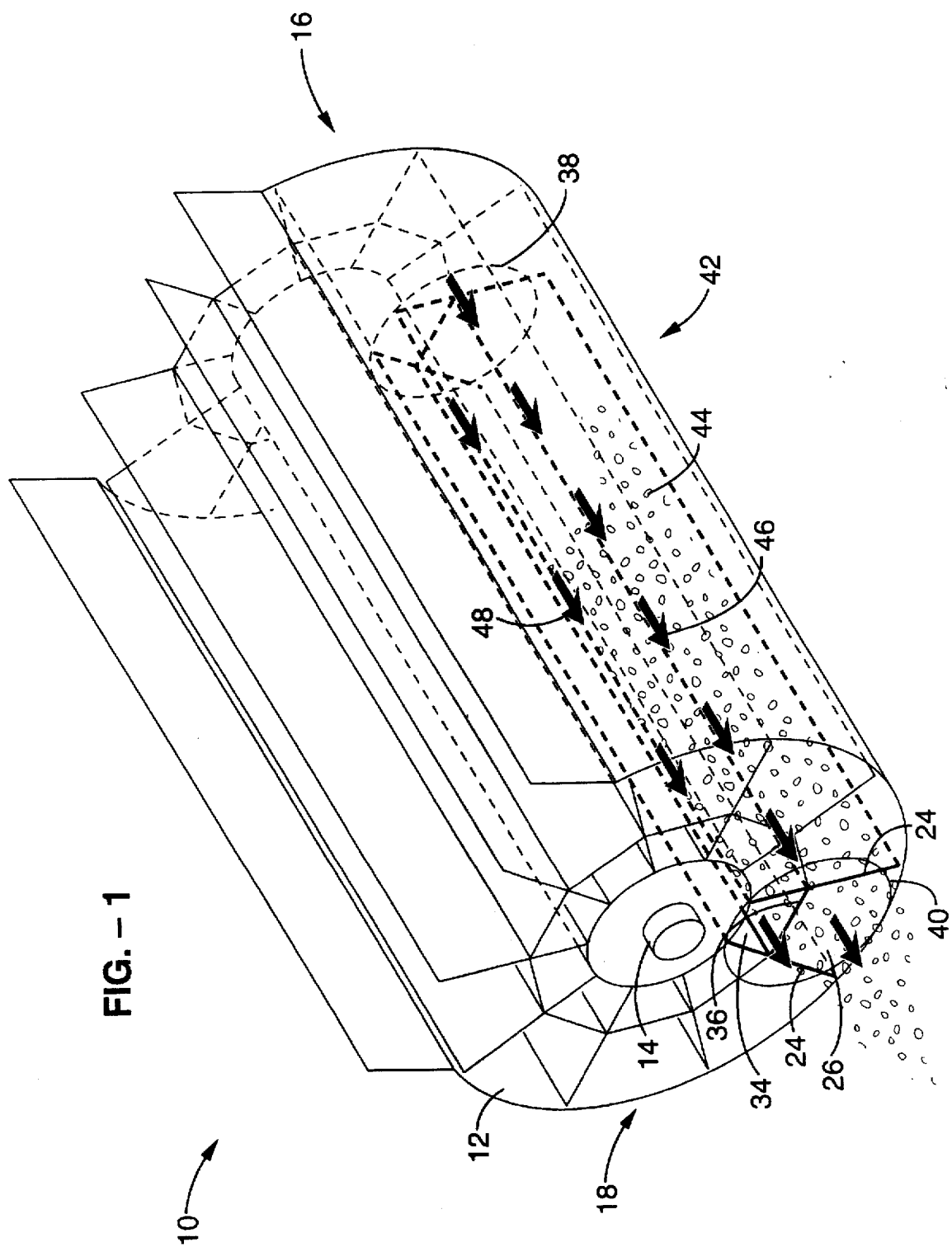
FIG. 1 is a perspective view of the air lock feeder of the present invention, showing diagrammatically the motion of aggregate material and air through a material fluidization chamber and supercharger chamber.
Figure 2:
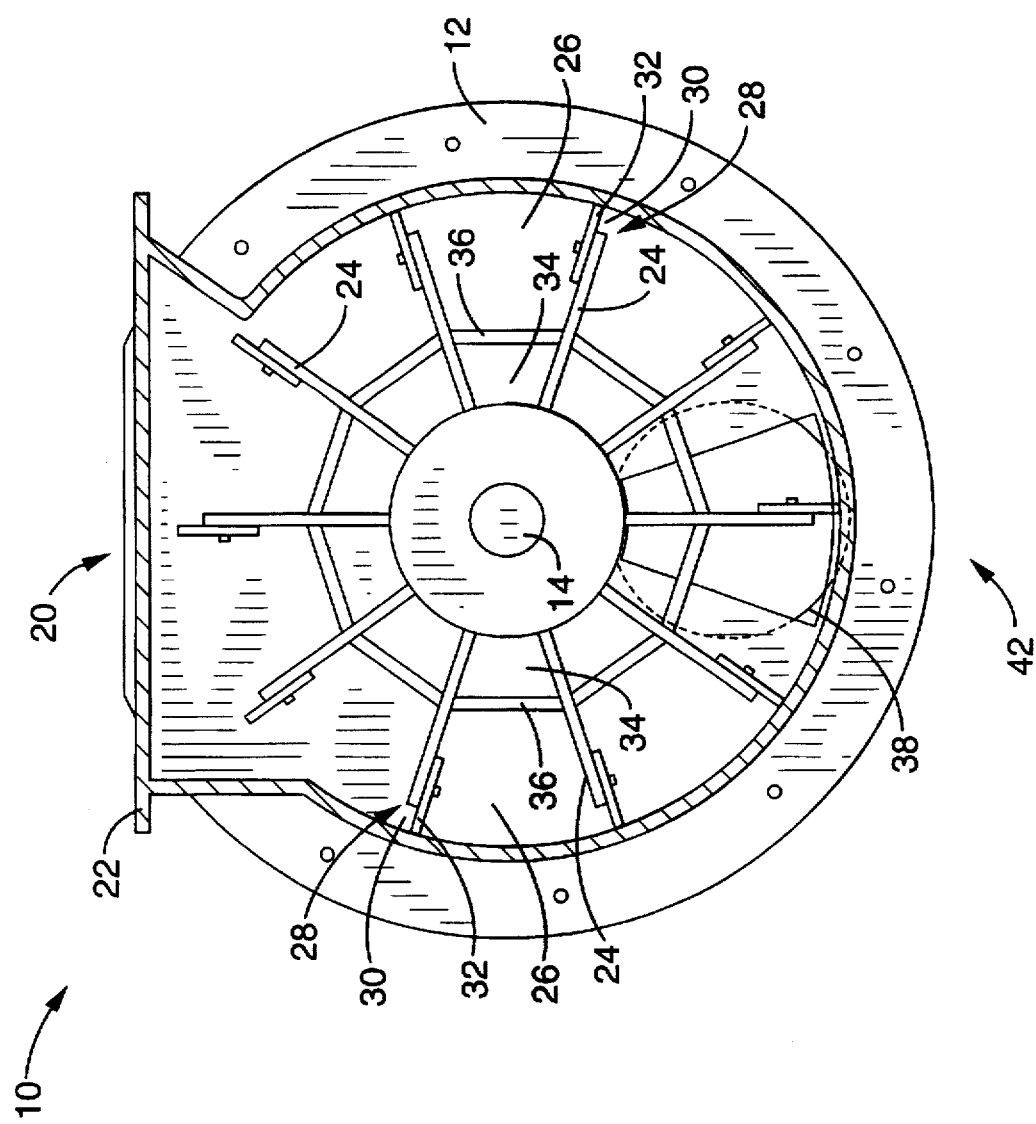
FIG. 2 is an end view in partial cross section of the air lock feeder in accordance with the present invention.
Figure 3:
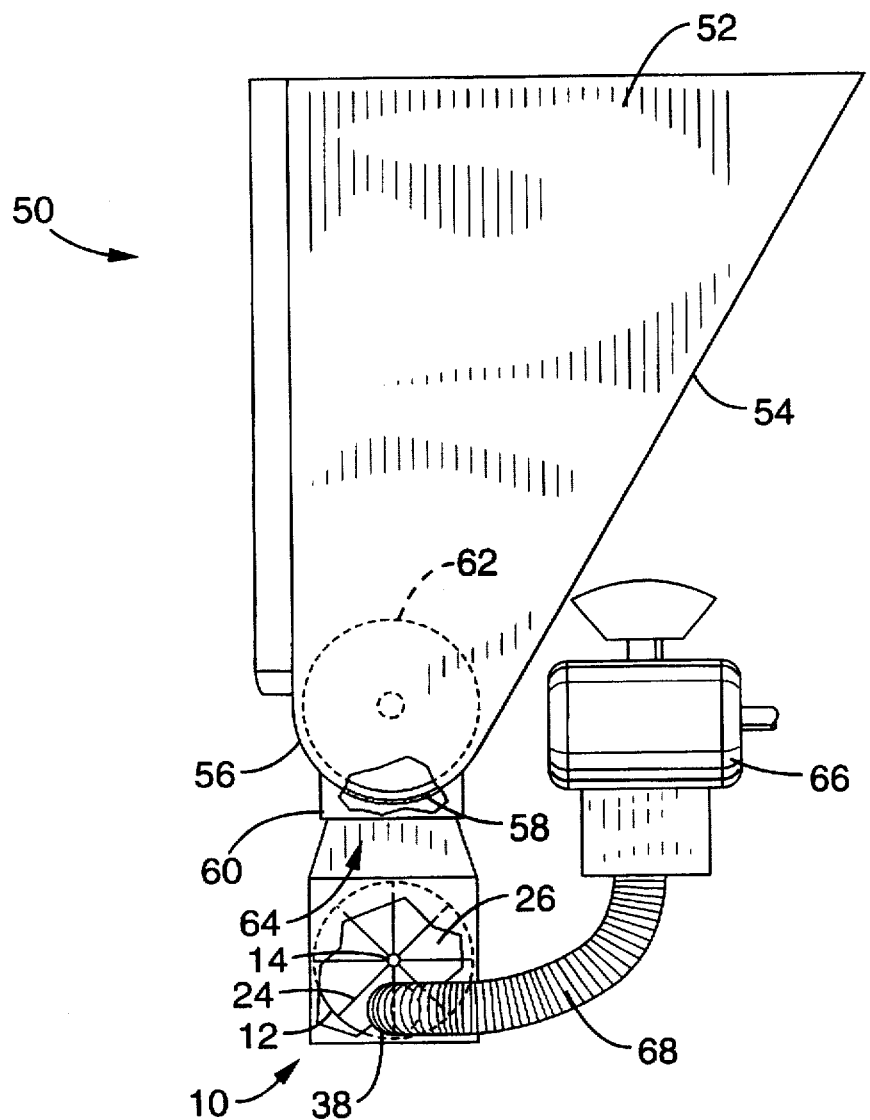
FIG. 3 is a side view of a chip blower apparatus employing the air lock feeder in accordance with the present invention, with the air lock feeder shown coupled to a hopper and the air lock feeder and hopper shown in partial cross-section.

Referring more specifically to the drawings, for illustrative purposes the present invention is embodied in the apparatus which is generally shown in FIG. 1 through FIG. 3. It will be appreciated by persons of ordinary skill in the art that the apparatus may vary as to configuration and as to details without departing from the basic concepts as disclosed herein. While the invention is described in terms of applying aggregate materials, it should be readily apparent that the invention may be utilized for entraining a variety of solid materials into air or other gas, with the solid materials comprising aggregate, fibrous, and particulate materials of various densities and porosities.

Referring first to FIG. 1 and FIG. 2, an air lock feeder 10 in accordance with the present invention is generally shown. Air lock feeder 10 includes a generally cylindrical housing 12 with a rotatable shaft 14 longitudinally mounted in housing 12 between first and second ends 16, 18. Suitable bearing supports (not shown) are included in association with shaft 14 adjacent ends 16, 18 of housing 12, and shaft 14 is conventionally keyed for mechanical interfacing with a rotational power source such as a hydraulic motor (not shown). A top facing opening 20 provides for receipt of material from a hopper (such as hopper 52 shown in FIG. 3). A flange adapter 22 is provided about opening 20 to facilitate coupling to a hopper. A plurality of vanes 24 are laterally disposed about shaft 14 and define a plurality of material entrainment or fluidization chambers 26 within housing 12 in a paddle wheel-like arrangement, with chambers 26 being generally elongated in shape, parallel to shaft 14, and having generally a wedge or trapezoidal shaped cross section. To reduce the hydraulic torque required to rotate shaft 14 and vanes 24, the ends 28 of vanes 24 are machined to provide gaps 30 between the ends 28 of vanes 24 and the inner wall of housing 12. A resilient strip or seal 32 of polymeric material such as polyurethane is coupled to the end 28 of each vane 24. Resilient strips 32 reduce the amount of shearing of material during rotation of shaft 14 and vanes 24 by flexing as they make contact with the inner wall of housing 12. Resilient strips 32 additionally provide an effective seal to minimize air pressure loss between vanes 24 and housing 12.

The air lock feeder 10 includes supercharging means for entraining materials within an air stream at high output rates. The supercharging means preferably comprises a plurality of auxiliary or supercharger air channels 34 which are laterally disposed about shaft 14. Air channels 34 are formed by a plurality of dividers or barriers 36 which separate the regions between adjacent vanes 24 to separate and define a dual chamber arrangement of material entrainment chambers 26 and adjacent air channels 34. The elongated region between each pair of adjacent vanes 24 thus includes an elongated air channel 34 of generally triangular or trapezoidal cross-section, and an elongated material entrainment chamber 26 of generally trapezoidal cross-section, which are parallel to each other and which are separated from each other by divider 36, with air channel 34 adjacent shaft 14 and material entrainment chamber 26 adjacent housing 12. A pressurized air inlet 38 and pressurized air outlet 40 are included at opposite housing ends 16, 18 of housing 12 and generally adjacent to the bottom 42 of housing 12. Air inlet 38 and outlet 40 are generally trapezoidal in cross-sectional shape adjacent chambers 26, 34, and transition to a round cross section to allow attachment of flexible hoses as described above.

In operation, air lock feeder 10 receives aggregate or other solid material to be entrained, conveyed and dispersed from a hopper or the like via opening 20 in the top of housing 12 while shaft 14 and vanes 24 are rotating within housing 12. Material entering air lock feeder 10 through opening 20 is received by material entrainment chambers 26 as they move or rotate past opening 20, and the material thus received by chambers 26 is transported downward towards the bottom 42 of housing 12 and towards inlet port 38 and outlet port 40. Air channels 34 are separated from material entrainment chambers 26 by dividers 36, as related above, and dividers 36 prevent air channels 34 from receiving any solid material from opening 20 and housing 12.

As each material entrainment chamber 26 and adjacent air channel 34 rotate into alignment inlet and outlet ports 38, 40, pressurized air from a blower or other source enters the material entrainment chamber 26 through inlet port 38 to fluidize and impart momentum to the solid material contained therein, and to move or convey the entrained material towards outlet port 40 and subsequently through a hose as described above for applying the material. The air-entrained material in chamber 26 is shown generally as particles 44, which are carried by the air stream, indicated by arrows 46, that passes through chamber 26 between inlet and outlet ports 38, 40. At generally the same time as material particles 44 are being entrained in air stream 46 within material entrainment chamber 26, pressurized air also passes through the adjacent air channel 34, as shown by air stream arrows 48. The air stream 48 passing through air channel 34 joins the air-entrained material 44 and air stream 46 in chamber 26 adjacent outlet port 40. This influx of air stream 48 into the material particles 44 and air stream 46 from chamber 26 adjacent outlet port 40 prevent clogging or formation of slugs of air entrained material 44 at outlet port 40 as described above. Thus, the dual chamber arrangement of the supercharger means of the invention allows air lock feeder 10 to operate at higher air pressures from inlet port 38, to operate at faster rotational rates of shaft 14 and vanes 24, and/or to operate at faster solid loading rate through opening 20, than is possible with other known feeder systems for entrainment of solid materials within air streams. Air lock feeder 10 is suitable for use in entraining a variety of solid particulate materials within an air or gas stream for pneumatic conveyance or other applications. Air lock feeder may be used for air-entrainment of fertilizers, seeds, road surfacing materials, insulation materials, aggregate materials including wood chips and engineered wood fibers, powders, and other particulate solids.

The material or product chambers 26 of air lock feeder 10 are positioned at the wide end of the pie slice-shaped cross-sectioned region between adjacent vanes 24, to provide a trapezoid shaped air channel 34 positioned directly adjacent the trapezoidal material entrainment chamber 26. This creates a material entrainment chamber 26 having a cross-sectional area that is much closer in size and shape to that of standard transport hoses of circular cross-section which are coupled to exit or outlet port 40, thereby providing a smoother transition at the outlet port 40 of air lock feeder 10. The dual chamber design of air lock feeder 10 virtually eliminates the risk of solid material 44 plugging or jamming within a hose coupled to outlet port 40. The additional air channels 34 provided by the super charging means allows some pressurized air 48 to bypass the material entrainment chambers 26 and then add or force additional air and pressure into the entrained solid material 44 from the material entrainment chambers 26 as the entrained solid material exits the air lock feeder 10 and enters the hose.

The supercharger means of air lock feeder 10 also creates an area or region of low pressure area at the outlet or exit port 40 adjacent material entrainment chamber 26 which draws the solid material 44 out of chamber 26, thereby assisting in the fluidization of the material within chamber 26 together with the pressurized air 46 that is pushing on the solid material from behind. The "Super Charge Chamber" design also allows a hose attached to exit port 40 to be constantly charged with air, thereby assuring that the material which is within the hose does not lose momentum and drop from the air stream prior to exiting the hose. The dual chamber arrangement of the supercharger means provides for air flow within a hose coupled to outlet port 40 even when shaft 14 of air lock feeder is rotating at speeds that would simulate a plug in conventional air feeders, by allowing additional air via air channels 34 into the hose to keep the material from falling out of the air stream and clogging the hose.

Preferably, the overall girth of air lock feeder 10 is maximized as much as allowed by the particular application of the invention in order to maximize the width of material entrainment chambers 26 and thereby maximize the amount of time each individual material entrainment chamber 26 has to pass by the exit port 40 during each rotational cycle. Such an arrangement allows more time for air entrained solid material to exit each material entrainment chamber 26. The increased dwell time allows for air lock feeder 10 to employ longer material entrainment chambers 26 and higher volume displacements. The air inlet port 38 can be fitted with an adjustable gate (not shown) to allow an operator to control the pressurized air charge entering material entrainment chambers 26 and air channels 34.

The supercharger means of the invention may alternatively comprise other means for introducing pressurized air flow at the outlet port 38 to prevent blockage and increase the level of material 44 entrained in the air stream. For example, it is contemplated that shaft 14 may be hollow or include hollow air channels for directing air from inlet port 38 towards outlet port 40 in a manner similar to air channels 34. It is also contemplated that supercharger air channels may be included longitudinally along bottom 42 of housing 12, either internally or externally relative to housing 12, which deliver pressurized air from inlet port 38 to outlet port 40 to aid in entrainment of solid material 44 in the manner described above. In such arrangements, the supercharger air channels would remain stationary while material entrainment chambers 26 rotated with shaft 14.

Referring now to FIG. 3, the present invention is shown in the context of a chip blower apparatus 50. The apparatus 50 comprises a hopper 52 or other like container for gravity, gravity assisted, or mechanical delivery of materials. Hopper 52 is preferably structured and configured to fit adjacent the back of a semi truck or other vehicle which carries wood chips or other material to be dispersed. The interior (not shown) of the hopper 52 is preferably structured and configured in such a manner as to prevent the material from bridging, castle-forming, or otherwise sticking thereto. Preferably, hopper 52 includes a tapered back 54, with a slope of about sixty degrees to prevent sticking of materials. Hopper 52 has a radius break 56 and a saddle-shaped bottom 58 adjacent a lower apex 60. An auger 62 or other agitating means, discussed further below, generally fits within hopper 52 adjacent radius break 56 and lower apex 60. The bottom 68 of the hopper includes an opening 64 with a conventional flange fitting (not shown) that mates up to flange 22 of air lock feeder 10. A blower 66 provides pressurized air to air lock feeder 10, for fluidizing and imparting momentum to materials contained therein. Blower 66 is interfaced with air lock feeder 10 by a hose 68 which couples to inlet port 38 via conventional fittings. A check valve (not shown) is located between air lock feeder 10 and blower 66 to prevent any back feeding of aggregate material from air lock feeder 10 into blower 66.

Accordingly, it will be seen that the present invention provides a air lock feeder apparatus which provides for air entrainment of particulate solids for quick and facile pneumatic conveyance and application of wood chips, fibrous materials, aggregate materials, or other solid particulate materials. Although the description above contains many specificities, these should not be construed as limiting the scope of the invention but as merely providing illustrations of some of the presently preferred embodiments of this invention.

What is claimed is:

1. An air lock feeder apparatus, comprising:
   (a) a housing, said housing including first and second ends, said housing including an inlet port adjacent said first end, said housing including an outlet port adjacent said second end, said housing including a laterally facing opening;
   (b) a shaft, said shaft rotatably mounted within said housing between said first and second ends;
   (c) a plurality of vanes, said vanes coupled to said shaft, said vanes extending laterally from said shaft, said plurality of vanes defining a plurality of chambers within said housing; and
   (d) supercharger means for increasing the output of air entrained solid material exiting said chambers.

2. An air lock feeder apparatus as recited in claim 1, wherein said supercharger means comprises a plurality of air channels in said air lock feeder, said air channels parallel to said shaft, said air channels perpendicular to said first and second ends of said housing.

3. An air lock feeder apparatus as recited in claim 2, wherein said air channels are adjacent said shaft.

4. An air lock feeder apparatus as recited in claim 3, wherein said air channels are formed by a plurality of dividers, one said divider positioned in one said chamber between adjacent said vanes, said dividers separating said air channels from said chambers.

5. An air lock feeder apparatus, comprising:
(a) a cylindrical housing, said housing including first and second ends, said housing including an inlet port adjacent said first end, said housing including an outlet port adjacent said second end, said housing including a laterally facing opening;
(b) a shaft, said shaft rotatably and longitudinally mounted within said housing between said first and second ends;
(c) a plurality of vanes, said vanes coupled to said shaft, said vanes extending laterally from said shaft, each said vane having an end, said plurality of vanes defining a plurality of chambers within said housing, said chambers parallel to said shaft, said chambers perpendicular to said first and second ends; and
(d) supercharger means for increasing the output of air entrained solid material exiting said chambers.

6. A air lock feeder apparatus as recited in claim 5, wherein said supercharger means comprises a plurality of air channels in said air lock feeder, said air channels parallel to said shaft, said air channels perpendicular to said first and second ends of said housing.

7. An air lock feeder apparatus as recited in claim 6, wherein said air channels are adjacent said shaft.

8. A air lock feeder apparatus as recited in claim 7, wherein said air channels are formed by a plurality of dividers, one said divider positioned in one said chamber between adjacent said vanes, said dividers separating said air channels from said chambers.

9. An air lock feeder apparatus, comprising:
(a) a cylindrical housing, said housing including first and second ends, said housing including an inlet port adjacent said first end, said housing including an outlet port adjacent said second end, said housing including a laterally facing opening;
(b) a shaft, said shaft rotatably and longitudinally mounted within said housing between said first and second ends;
(c) a plurality of vanes, said vanes coupled to said shaft, said vanes radiating laterally from said shaft, said vanes extending longitudinally in said housing between said first and second ends, said plurality of vanes defining a plurality of longitudinal chambers within said housing, said chambers parallel to said shaft, said chambers parallel to said vanes, said chambers perpendicular to said first and second ends, said chambers extending between said first and second ends; and
(d) a plurality of dividers, one said divider positioned between adjacent said vanes, said dividers defining a plurality of air channels, said air channels separated from said chambers by said dividers, said air channels adjacent to said shaft, said air channels parallel to said shaft.

10. A air lock feeder apparatus as recited in claim 9, wherein said air channels are perpendicular to said first and second ends of said housing, said air channels extending longitudinally between said first and second ends, said air channels parallel to said chambers, said air channels parallel to said dividers.

* * * * *

UNITED STATES PATENT AND TRADEMARK OFFICE
CERTIFICATE OF CORRECTION

PATENT NO. : 5,725,332
DATED : March 10, 1998
INVENTOR(S) : Derick E. Harper; Gordon D. Hammond It is certified that error appears in the above-indentified patent and that said Letters Patent is hereby corrected as shown below:

Column 2, line 34, before "invention" insert --present--.

In the Abstract:

Line 8, change "cambers" to --chambers--.

Signed and Sealed this

Twenty-first Day of July, 1998

Attest:

BRUCE LEHMAN

Attesting Officer      Commissioner of Patents and Trademarks